May 9, 1961 J. L. MICHAELIS 2,983,871
DIRECT CURRENT MEASUREMENT
Filed March 26, 1958 2 Sheets-Sheet 1

INVENTOR.
JOHN L. MICHAELIS
BY
Oscar L. Spencer
ATTORNEY

INVENTOR.
JOHN L. MICHAELIS
BY Oscar L. Spencer
ATTORNEY

United States Patent Office 2,983,871
Patented May 9, 1961

2,983,871
DIRECT CURRENT MEASUREMENT
John L. Michaelis, Pittsburgh, Pa., assignor, by mesne assignments, to Pittsburgh Plate Glass Company
Filed Mar. 26, 1958, Ser. No. 724,085
7 Claims. (Cl. 324—119)

The present invention relates to electrical conversion systems providing direct current and amperages in excess of 10,000 amperes, usually above 20,000 amperes, and frequently above 80,000 amperes, at voltages in the range of from 10 to 500 volts or above from alternating current power sources, and more particularly to methods and apparatus for measuring direct current amperes in systems of this type producing direct currents of such high magnitudes.

Accurate measurement of direct current amperes in systems which produce direct currents of high magnitude, that is, in the range of 10,000 amperes or more from an alternating current power source, is often a difficult problem. Systems which provide direct currents of such high amperage generally employ a standard series resistor method for measuring current or utilize transducers to accomplish the measurement of current. Both of the above mentioned systems are cumbersome and expensive and the size and cost of equipment is proportional to the magnitude of the direct currents to be measured. In addition to the disadvantages presented by the physical size and high cost of equipment necessary to accomplish measurement of high direct current with systems of this type, calibration of the measuring devices utilized in such systems is a serious problem since manufacturers of this equipment generally do not have direct current of such high magnitudes available for use in calibrating these devices. Thus, most equipment of the hereinabove referred to type is calibrated from low direct current sources by calculation for use at extremely high amperages.

According to the present invention the disadvantages normally encountered in measuring direct currents of high amperages in electrical systems producing direct currents in the range of 10,000 to 200,000 amperes or more from alternating current power sources are minimized or completely obviated. Thus, considerable reductions in the size and expense of equipment necessary to accurately measure direct currents in the above ranges is accomplished. In addition, the use of equipment easily calibrated by the manufacturer renders all measurements taken in the system extremely accurate thereby allowing for a particularly effective and sensitive, overall measurement of direct current amperes.

Thus, by the method of the present invention direct current amperes of high magnitude provided by an electrical conversion system from an alternating current power source are measured by determining or measuring the alternating current power input to the system, determining or measuring the direct current output voltage from the system, and producing a signal in response to each measurement. The two signals produced by the alternating current kilowatt input measurement and the direct current output voltage measurement are then fed to a current measuring device which mechanically or electrically is designed to divide the signal from the kilowatt measuring unit by the signal from the direct current voltage measuring unit, and to electrically multiply the quotient by a constant which represents the overall efficiency of the electrical conversion system producing the direct current. The current measuring device produces a signal which is recorded or which may be otherwise utilized to indicate in direct current amperes.

For a more complete understanding of the method of the present invention, reference is made to the drawings in which.

Figure 1:
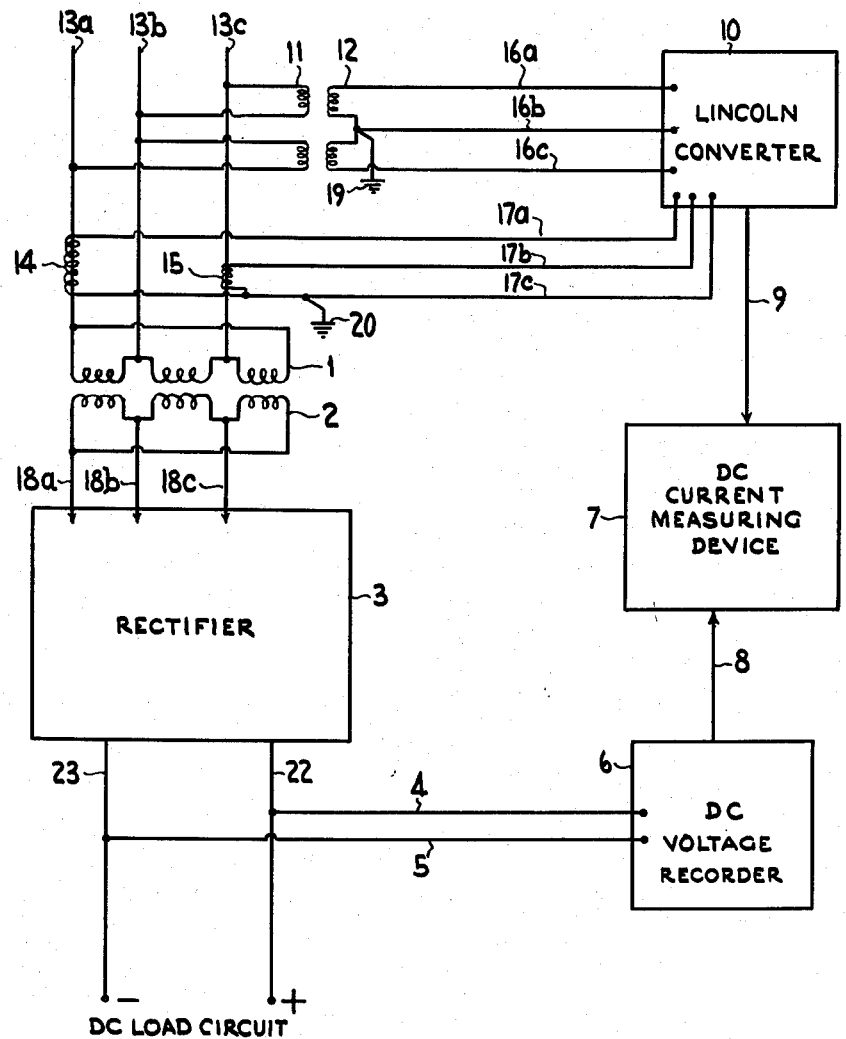
Fig. 1 is a diagrammatic illustration of the novel assembly of equipment utilized in measuring high amperage direct currents.

In Fig. 1, three phase alternating current power is supplied through 13a, 13b and 13c to the primary 1 of a power transformer. The secondary of the power transformer 2 through 18a, 18b and 18c supplies alternating current to rectifier 3. Direct current produced in rectifier 3 provides direct current load through bus bars 22 and 23. Across the alternating current power leads 13a, 13b and 13c are connected the primaries 11 of a potential transformer. Connected in series with leads 13a and 13c are windings 14 and 15 of a current transformer. Leads 16a, 16b and 16c from the secondary 12 of the potential transformer are electrically connected to a Lincoln converter 10. Leads 17a, 17b and 17c from 14 and 15 of the current transformer are also connected to the Lincoln converter 10. Leads 4 and 5 are connected across bus bars 22 and 23 and are connected at their other end to a direct current voltage measurement meter 6, adapted to produce a signal in response to a given voltage measurement by appropriate means such as transmitting slide wires and the like. Signals from the voltage measurement meter 6 are conducted through line 8 to a direct current measuring device 7. In like manner electrical signals from Lincoln converter 10 are conducted through lead 9 to the direct current measuring device 7.

In the operation of the system of Fig. 1, alternating current power through leads 13a, 13b and 13c is fed to primary winding 1 of the power transformer. Leads 18a, 18b and 18c conduct power from the secondary winding 2 of the power transformer to the rectifier 3. In rectifier 3 the alternating current power input is converted to direct current power and through leads 22 and 23 supplied to a direct current load circuit. The alternating current power input to the power transformer is continuously metered or measured by the potential measuring transformer 11—12 and the current measuring transformer 14—15. The signals produced by both transformers are fed through leads 16a, 16b and 16c and leads 17a, 17b and 17c to Lincoln converter 10.

Direct current voltage from the rectifier 3 across leads 22 and 23 is measured on voltage measuring meter 6 by connecting across lines 22 and 23 leads 4 and 5 of the direct current voltage measuring meter. The output signals of the direct current voltage measuring meter 6 and the Lincoln converter 10 are designed to read in millivolts and are carried through lines 8 and 9 respectively to a direct current measuring device 7. In the direct current measuring device 7, the output of the Lincoln converter represented by the voltage in lead 9 is divided by the voltage output of the direct current voltage measuring meter represented by the voltage carried in line 8 and the quotient multiplied by the efficiency of the rectifier system 3, which is a constant and may be a fixed resistor, a millivoltage or other similar electrical value or means. This measurement gives an accurate reading of the direct current amperes flowing in the direct current load circuit at any one time.

Figure 2:
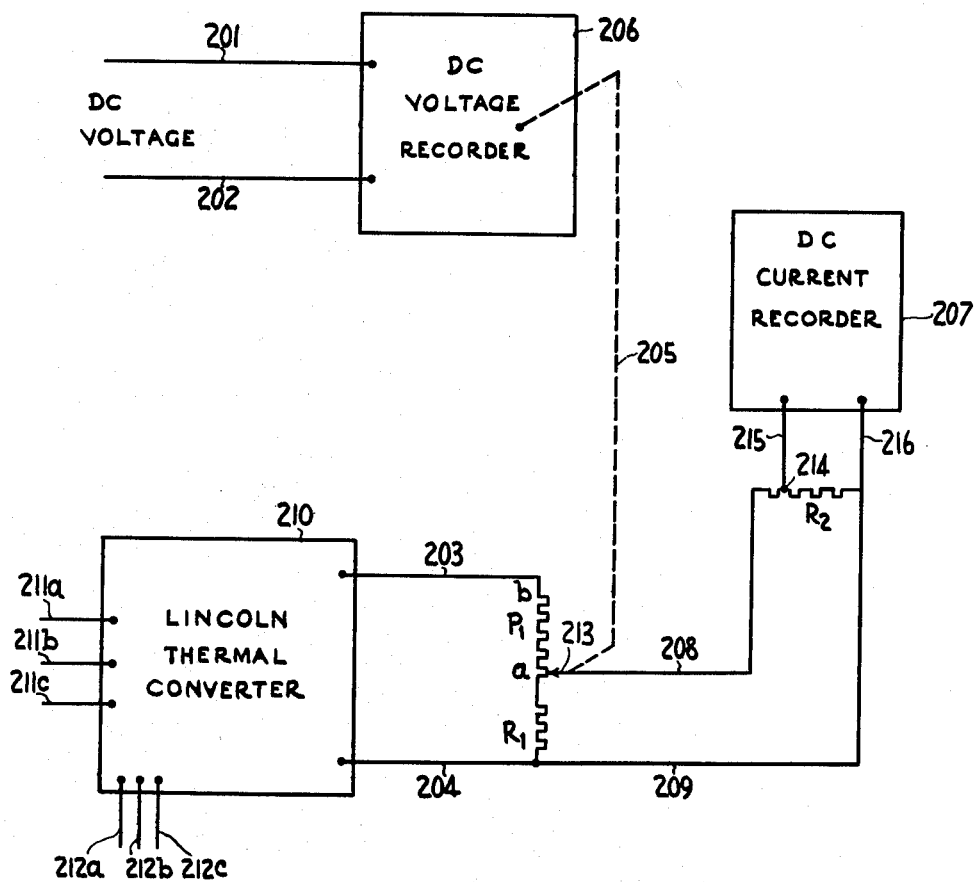
Fig. 2 is a schematic diagram of a calculating circuit utilized in measuring direct current.

Fig. 2 shows diagrammatically an arrangement of electrical elements capable of conducting the computations hereinabove described and recording the results in direct current amperes. Leads 201 and 202, connected across the direct current output of an electrical conversion system producing direct current from an alternating current power source, are connected to a direct current voltage recording instrument 206. Instrument 206 may be conveniently a conventional null balance type potentiometer having a zero to 100 percent voltage range. A suitable indicator arm (not shown) is provided on recorder 206 which is movably responsive to variations in the voltage measured by 206.

Alternating current power being fed to the electrical conversion system being measured is fed into the Lincoln converter 210 by leads 211a, 211b and 211c of a current transformer (not shown) and leads 212a, 212b and 212c of a potential transformer (not shown). The connections of a current transformer and a potential transformer adapted to accomplish this power measurement are shown in Fig. 1. The power fed to the converter 210 produces a voltage output through leads 203 and 204 which is proportional to the power input to converter 210.

Connected across leads 203 and 204 are a fixed resistor $R_1$ and a potentiometer $P_1$. Potentiometer $P_1$ is provided with a sliding contact 213. Contact 213 is linked through suitable mechanical linkage 205 to the recorder arm of the direct current voltage recorder 206. The design is such that contact 213 is at point $a$ on $P_1$ at 100 percent voltage and at point $b$ at zero percent voltage. Contact 213 moves along $P_1$ in response to variances in voltage measured by recorder 206 through linkage 205.

Leads 208 and 209 (connected to resistors $R_1$ and $P_1$) have a resistor $R_2$ connected across their terminals. Resistor $R_2$ is a fixed resistor having a tap 214 located thereon at a point representative of the efficiency of the electrical conversion system. Tap 214 is shown as a fixed connection in the drawing but could by appropriate design of the instrument 207 be made movable to provide a manual adjustment of the efficiency constant for varying load conditions obtaining in the electrical system being measured. Leads 215 and 216 are connected to recorder 207 equipped with a dial and indicator to provide a reading in amperes in response to voltage input through leads 215 and 216.

In the operation of the system of Fig. 2 a constant reading of the direct current voltage of the electrical conversion system being measured is taken through leads 201 and 202 and recorded on device 206. Alternating current power input to the electrical conversion system being measured is determined by leads 211a, 211b and 211c and leads 212a, 212b and 212c of a current transformer and a potential transformer respectively which are connected to the direct current power input and the thermal converter 210. Resistor $R_1$ is a 100 ohm resistor and potentiometer $P_1$ is a 900 ohm resistor. The converter 210 may be designed to provide a 100 millivolt direct current output at a 100 percent power input. For example, converter 210 can be designed to give a 100 millivolt output for a 32,000 kilowatt alternating current power input; thus, in this instance, 100 percent alternating current power input would equal 32,000 alternating current kilowatts.

When the contact 213 is in position $a$ on potentiometer $P_1$ the millivolts output in leads 208 and 209 is therefore 10 millivolts. Resistor $R_2$ is a 100 ohm resistor with tap 214 being provided at a point representing 95.6 ohms. This value is selected where the efficiency of the electrical conversion system measured at a given load has been determined to be 95.6 percent at that given load. 214 therefore can be selected at any percentage ohmage value of the total resistance of $R_2$ depending on the efficiency of the system measured. If the system was determined to have an efficiency of 80 percent, then point 214 would be located at a point representing 80 ohms. In this manner computation for the efficiency of the electrical conversion system measured is accomplished. The voltage output to leads 215 and 216 is measured in recorder 207 and by appropriate mechanical means the direct current amperes of the electrical system are indicated on a scale where 9.56 millivolts input would equal 100 percent full scale reading in direct current amperes.

Potentiometer $P_1$ is designed with a tapered resistor to provide a voltage output representative of the change in position of contact 213 in response to varying voltages recorded in 206. The following table illustrates a scheme of design of the instruments of Fig. 2.

[$R_1$=100 ohms]
[$P_1$=900 ohms]

| Voltage Value Indicated by Direct Current Voltage Instrument (Percent) | Potentiometer Voltage Output in Millivolts at 100 Millivolt Input | $R_1$ Voltage in Millivolts at 100 Millivolt Input | Total Voltage Output to Wires 208 and 209 (Millivolts) |
|---|---|---|---|
| 100 | 0 | 10 | 10.00 |
| 90 | 1.11 | 10 | 11.11 |
| 80 | 2.50 | 10 | 12.50 |
| 70 | 4.28 | 10 | 14.28 |
| 60 | 6.67 | 10 | 16.67 |
| 50 | 10.00 | 10 | 20.00 |
| 40 | 15.00 | 10 | 25.00 |
| 30 | 23.33 | 10 | 33.33 |
| 20 | 40.00 | 10 | 50.00 |

Instrument not satisfactory below 20 percent normal input voltage.

The unit 3 of Fig. 1 in the drawing indicated generally as a rectifier may comprise any rectifier system capable of producing direct current in amperages above 10,000 amperes, such as large germanium rectifier installations, large silicon rectifier installations, mercury arc rectifier systems, and the like. In addition, unit 3 may also represent motor generator systems and other similar electrical stations or installations which are capable of producing direct current in extremely high amperages from an alternating current power source.

The power transformer 1—2 may be a step-down or step-up power transformer. It may also include autotransformers of the tap changing underload type or any other suitable transformer for supplying power for conversion to a direct current producing power system. While for convenience transformer 1—2 has been shown as a three phase transformer in connection with a three phase alternating current power input system, it will be understood, of course, that single phase, two phase, six phase, or multi phase systems are contemplated by the method and apparatus shown. In addition unit 3 may in practice include a plurality of parallel rectifiers, or rectifier circuits, or motor generators in parallel or series or combinations of series and parallel circuits. Similarly, the power transformers shown may be a plurality in parallel instead of one as shown and the power inputs to each of a plurality of transformers may be measured individually and then summarized. This summarized power input would then be measured against the total direct current voltage output from either an individual rectifier of a plurality or from a direct current bus or load supplied by a plurality of individual rectifiers.

The Lincoln converter 10 is a well known electrical device utilized to measure accurately alternating current power in any alternating current power system. The alternating current voltage and the alternating current amperage are connected to the converter system where the electrical impulses fed to the converter are transformed into heat energy which in turn produces an electrical direct current voltage output from the converter which is proportional to the alternating current power input and which may be measured. The direct current voltage measuring meter 6 is a standard millivoltmeter-potentiometer type meter capable of measuring voltages and converting them to other units for recording or further measurement by producing a signal proportional to the actual voltage measured by leads 4 and 5, and transmitting it through line 8.

The direct current measuring device 7 may be composed of standard electrical circuitry which will automatically divide the value of input 9 by the value of input 8 and multiply it by the efficiency of the rectifier 3 which is represented by an electrical constant designed into the measuring circuit. Fig. 2 is representative of one form of circuitry which this instrument may be provided with to accomplish these ends.

While unit 7 has been discussed mainly as an electrical device it may also include mechanical features. Thus, for example, the electrical impulse of line 9 and the electrical impulse of line 8 may be converted by methods well known within the skill of the art to air pressures and the division and multiplication of the outputs of voltmeter 6 and converter 10 and the efficiency of rectifier 3 accurately accomplished by well known pneumatic means.

As will be readily seen, the measurement of direct current amperage by the utilization of the novel arrangement of known, accurate electrical equipment, relatively inexpensive and extremely small in physical size, is easily accomplished according to the method of this invention. The devices utilized are easy to install and calibrate, and require a minimum of maintenance. The efficiency of the overall direct current conversion system 3 is quite easily calculated by a summation of loss method wherein the output of the system divided by the output of the system plus losses results in the overall efficiency of the direct current conversion system. Thus, for a given rectifier system, for example, each piece of equipment contained therein is measured for losses and a summary of all the losses of all pieces of equipment contained within the system will give the total losses in the entire system. For example, in measuring the losses of the transformers utilized in the overall direct current power producing system, the transformers are first energized but carry no load. The total watt input to the transformer would thereby equal the total iron losses. A second measurement would be taken by short circuiting the secondary of the power transformer and measuring the input power required at 100 percent current flow. This second reading would give total copper losses in the transformer. By well known standard calculation procedures the total transformer losses under normal operating conditions is thereby obtained. Measurements of this type are conducted throughout the entire power system, including the alternating current power supplies to the primaries of the transformers, the supply current leads from the secondary of the transformers to the rectifiers, the rectifiers themselves, all bus connections contained within the rectifier system, and in this way, the total overall losses throughout the entire system are determined. This method has provided to be an efficient method of determining total efficiency in any electrical power system and/or electrical conversion system.

Thus, as is readily apparent the accurate determinations of the overall efficiency of the direct current power producing system permits the use of a measuring method which measures alternating current power input and direct current voltage output to determine direct current amperage produced in a direct current electrical system. The alternating current power input supply multiplied by the efficiency of the conversion system effectively provides a measurement of direct current power input. A division of this figure by the direct current voltage output of the rectifier system or the direct current power producing system gives a reading in direct current amperages which is accurate and indicates at any moment the direct current amperes flowing in the direct current load circuit.

The efficiency of the direct current power producing system as indicated hereinabove is determined usually by a summation of losses method. It will be understood, of course, that in determining the efficiency of any direct current power producing system by this method, consideration must be given to the specific load carried by the system. In other words, the efficiency of the overall system will vary with the specific load carried by the system at any one time. This will affect the accuracy of the measurement of the direct current amperage from such a system in that the constant representing the efficiency of the direct current producing system may be of a varying type. If the variance at different values of specific loads is extremely small, considering the overall current produced by the system, a mean value representing the average efficiency of the system at any given load may be employed. On the other hand, if it is desired that extremely accurate measurement of the system be available at all times, simple circuitry will permit the use of a variable value in the direct current measureing device, so that for differing loads the constant may be easily changed by turning a dial. In this manner a complete and accurate record of measurement of the direct current amperage from a large direct current power producing system is available at all times.

While the present invention has been described with reference to certain specific embodiments thereof, it is, of course, understood that many modifications may be made in the electrical devices utilized for measuring power input and voltage output without departing from the scope and spirit of the invention. Thus, the particular arrangement of circuitry, slide wires, voltage dividers, and the like, utilized in the direct current measuring device is of no particular significance so long as they are capable of dividing the voltage output measurement from the Lincoln converter by the voltage output from the direct current voltage measurement means and multiplying the quotient by a voltage, representing the efficiency constant of the rectification system. Circuitry utilized to accomplish the mathematical computations required in accordance with this invention may be widely varied since specific manufacturers of commercial instruments utilize various techniques and electrical subassemblies to accomplish computations of this type and hence, the invention is not to be limited by the particular computation circuit shown.

Similarly, the utilization of mechanical means to accomplish the multiplication and division taking place in the direct current measuring device may be of the well known pneumatic type and the particular arrangement of components in such a system to accomplish these mathematical steps is of no particular consequence.

I claim:

1. A method of measuring direct current amperes in an electrical conversion system which produces direct currents in excess of 10,000 amperes from an alternating current power source comprising measuring the alternating current power input supplied to the system and producing a signal in response thereto, measuring the direct current output voltage of the system and producing a signal in response thereto, feeding both signals to a measuring circuit, electrically dividing the alternating current power input signal by the direct current voltage output signal and electrically multiplying the quotient of this division by an electrical constant representing the efficiency of the electrical conversion system at a given load.

2. An apparatus for measuring direct current amperes in an electrical conversion system providing direct current in excess of 10,000 amperes from an alternating current power source comprising means connected across said alternating current power source for measuring alternating current volts, means connected in series with said power source for measuring alternating current amperes, means to produce a voltage representing the product of the alternating current volt and ampere measurement, means connected across the direct current output of the system to measure the direct current output voltage and produce a voltage in response to the direct current output voltage, means to electrically divide the voltage produced by the alternating current volt and ampere measurement by the voltage produced by the direct current output voltage measurement, means to electrically multiply the quotient by a constant representing the efficiency of the electrical conversion system at a given load, and to produce a signal in response to the multiplication and means to measure said signal.

3. Means for measuring direct current amperes in an electrical conversion system providing direct current from an alternating current power source comprising means connected across said alternating current power source for measuring alternating current volts, means connected in series with said alternating current power source for measuring alternating current power amperes, means for producing a signal representing the product of the alternating current volt and ampere measurements, means connected across the direct current output of said system to measure the direct current output voltage and produce a signal in response to the direct current output voltage measurement, means to electrically divide the signal representative of the alternating current volt and ampere measurements by the signal produced by the direct current output voltage measurement, means to multiply the quotient by a constant representing the efficiency of the electrical conversion system at a given load to produce a signal in response to said multiplication and means to measure the signal responsive to said multiplication.

4. An apparatus for measuring direct current amperes in an electrical conversion system providing direct current from an alternating current power source comprising a potential transformer connected across said power source and to a thermal converter, a current transformer connected in series with said alternating current power source and to said thermal converter, a rectifier connected to said alternating current power source and capable of providing direct current amperes to a load, means connected across the direct current output of said rectifier to measure the direct current voltage, and produce a signal in response to the measurement, a summarizing circuit for receiving signals from said thermal converter and said direct current voltage measuring means said signals being proportioned to the power input to said converter and said direct current voltage measuring means, means in said summarizing circuit capable of electrically dividing signals from the thermal converter by signals from the direct current voltage measuring means, means to multiply the quotient obtained by said electrical division by an electrical constant representing the efficiency of the electrical conversion system at a given load to thereby produce a signal in response thereto and means for measuring said signal so produced.

5. An apparatus for measuring direct current amperes in an electrical conversion system providing direct current from an alternating current power source comprising a potential transformer connected across the power source to a thermal converter, a current transformer connected in series with the alternating current power source and the thermal converter, a rectifier connected to the alternating current power source and capable of providing direct current amperes therefrom, output direct current carrying means from the rectifier capable of supplying a direct current load; means connected across the output direct current carrying means to a direct current voltmeter, means for carrying impulses from the thermal converter to a summarizing circuit, said summarizing circuit, having a fixed resistor and a sliding contact potentiometer connected in series across the impulse carrying means from the thermal converter, mechanical linkage responsive to voltmeter readings connecting the voltmeter to the sliding contact to provide movement of the contact in response to voltmeter measurements, impulse carrying means connected across said resistor and potentiometer sliding contact and across a second resistor having a value representative of the efficiency of the rectifier system at a given load and means connected across the second resistor for carrying impulses to a direct current recorder.

6. An apparatus for measuring direct current amperes in an electrical conversion system providing direct current from an alternating current power source comprising means for measuring the alternating current input to the electrical conversion system and provide in response to said measurement a signal proportional to the power input, means to measure the direct current output voltage of said electrical conversion system and produce a signal in response thereto, a summarizing circuit for receiving the signals produced by the alternating current power input and the direct current voltage output, said summarizing circuit including means for electrically dividing the signals produced by said power input measurement by the signal produced by the direct current voltage measurement, means for electrically multiplying the quotient obtained by said electrical division by an electrical constant representing the efficiency of the electrical conversion system at a given load to thereby produce a signal and means for measuring said last produced signal.

7. The means for measuring direct current amperes in an electrical conversion systm of claim 3 in which there is a means to change the value of the efficiency constant.

References Cited in the file of this patent
UNITED STATES PATENTS

| | | |
|---|---|---|
| 2,434,544 | Boykin | Jan. 13, 1948 |
| 2,744,240 | Hughes | May 1, 1956 |

UNITED STATES PATENT OFFICE
CERTIFICATE OF CORRECTION

May 9, 1961

Patent No. 2,983,871

John L. Michaelis

It is hereby certified that error appears in the above numbered patent requiring correction and that the said Letters Patent should read as corrected below.

Column 5, line 56, for "provided" read -- proved --; column 6, line 18, for "measureing" read -- measuring --.

Signed and sealed this 1st day of May 1962.

(SEAL)
Attest:

ERNEST W. SWIDER
Attesting Officer

DAVID L. LADD
Commissioner of Patents